United States Patent
Yang

(10) Patent No.: US 11,363,672 B2
(45) Date of Patent: Jun. 14, 2022

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/897,169

(22) Filed: Jun. 9, 2020

(65) Prior Publication Data

US 2020/0323027 A1 Oct. 8, 2020

Related U.S. Application Data

(63) Continuation of application No. PCT/CN2018/086160, filed on May 9, 2018.

(30) Foreign Application Priority Data

Feb. 12, 2018 (WO) ................. PCT/CN2018/076581

(51) Int. Cl.
*H04W 80/08* (2009.01)
*H04W 76/27* (2018.01)
*H04W 4/12* (2009.01)

(52) U.S. Cl.
CPC ............. *H04W 80/08* (2013.01); *H04W 4/12* (2013.01); *H04W 76/27* (2018.02)

(58) Field of Classification Search
CPC ....... H04W 4/12; H04W 80/08; H04W 76/27; H04W 76/10; H04W 36/14; H04W 36/02; H04W 36/00; H04W 36/0055
See application file for complete search history.

(56) References Cited

U.S. PATENT DOCUMENTS 9,854,478 B2 12/2017 Ozturk et al.
2015/0208286 A1 7/2015 Ozturk et al.
(Continued)

FOREIGN PATENT DOCUMENTS

CN 102761921 A 10/2012
CN 103533586 A 1/2014
(Continued)

OTHER PUBLICATIONS

Written Opinion of the International Search Authority in the international application No. PCT/CN2018/086160, dated Oct. 29, 2018.
(Continued)

*Primary Examiner* — Diane D Mizrahi
(74) *Attorney, Agent, or Firm* — Ladas & Parry, LLP

(57) ABSTRACT

Provided in embodiments of the present application are a wireless communication method, a terminal device and a network device. The method includes that: a terminal device determines that a first message generated based on a first Packet Data Convergence Protocol (PDCP) has been successfully sent to a network device, the first message indicating the network device to switch the first PDCP to a second PDCP; and the terminal device sends a second message generated based on the second PDCP to the network device. According to the method, the terminal device and the network device, the network device can correctly parse messages sent by the terminal device.

9 Claims, 7 Drawing Sheets

(56) References Cited

U.S. PATENT DOCUMENTS

| | | | |
|---|---|---|---|
| 2016/0262066 A1 | 9/2016 | Ozturk et al. | |
| 2017/0055283 A1 | 2/2017 | Shrivastava et al. | |
| 2019/0387401 A1* | 12/2019 | Liao | H04W 12/082 |

FOREIGN PATENT DOCUMENTS

| | | |
|---|---|---|
| CN | 103733587 A | 4/2014 |
| CN | 105075170 A | 11/2015 |
| CN | 105723801 A | 6/2016 |
| CN | 105917699 A | 8/2016 |
| CN | 106470439 A | 3/2017 |
| CN | 107409336 A | 11/2017 |
| WO | 2016186697 A1 | 11/2016 |
| WO | 2017173133 A1 | 10/2017 |

OTHER PUBLICATIONS

Written Opinion of the International Search Authority in the international application No. PCT/CN2018/076581, dated Nov. 12, 2018.

Huawei et al.;. "NR PDCP Configuration for SRB in E-UTRA Connected to 5GC;" 3GPP TSG-RAN WG2 Meeting #100 R2-1713134;, Dec. 1, 2017 (Dec. 1, 2017), p. 1, section 2.2, and figure 1.

LG Eiectronics Inc.;, "Consideration on PDCP Version Change in eLTE;" 3GPP TSG-RAN2 Meeting RAN2 #100 R2-1713610;, Dec. 1, 2017 (Dec. 1, 2017), sections 1 and 2, and figure 2.

Huawei et al.;. "NR PDCP for SRB for a UE Accessing 5GC via ng-eNB;" 3GPP TSG-RAN WG2 Meeting #99bis R2-1711110;, Oct. 13, 2017 (Oct. 13, 2017), p. 1, section 2.2, and figure 1.

International Search Report in the international application No. PCT/CN2018/086160, dated Oct. 29, 2018.

International Search Report in the international application No. PCT/CN2018/076581, dated Nov. 12, 2018.

Qualcomm Incorporated, "SRB1 PDCP version change for UEs connecting to 5GCN through E-UTRAN", 3GPP TSG-RAN2 Meeting #100 R2-1712263, Reno, USA, Nov. 27 to Dec. 1, 2017.

Qualcomm Incorporated, "Type of PDCP Protocol Adoption for E-UTRAN connected to 5GCN", 3GPP TSG-RAN2 Meeting #99bis R2-1710160, Prague, Czech Republic, Oct. 9-13, 2017.

Huawei, "Report from offline discussion #037", 3GPP TSG-RAN WG2 #100 R2-1714174, Reno, USA, Nov. 27-Dec. 1, 2017.

First Office Action of the Chinese application No. 202010098131.3, dated Apr. 19, 2021.

Second Office Action of the Chinese application No. 202010098131.3, dated Jul. 6, 2021.

* cited by examiner

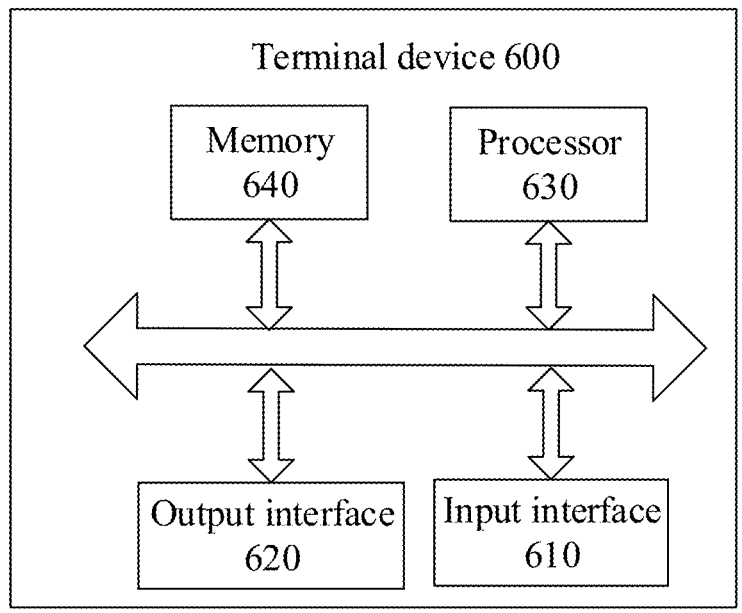
FIG. 7
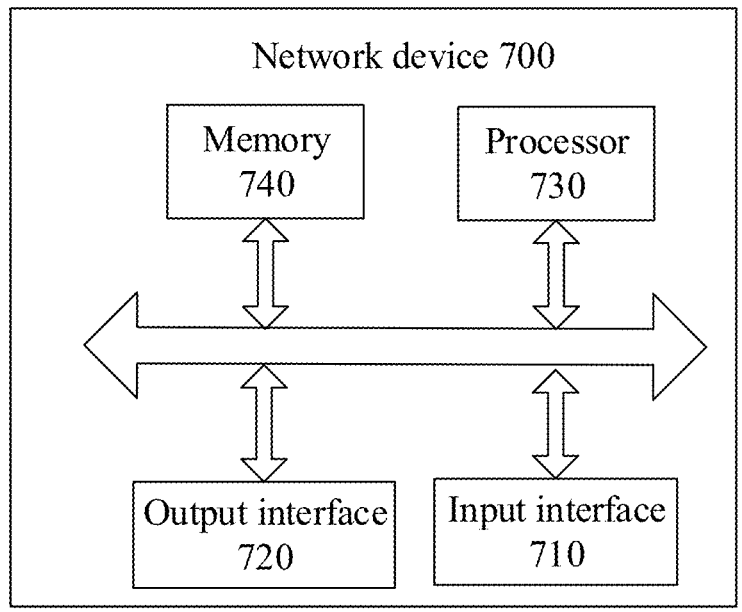
FIG. 8
800 — A terminal device receives a first message generated based on a first PDCP from a network device, the first message indicating the terminal device to use a second PDCP ~ 810
The terminal device sends a second message generated based on the second PDCP to the network device according to the first message ~ 820
FIG. 9

WIRELESS COMMUNICATION METHOD, TERMINAL DEVICE AND NETWORK DEVICE

CROSS-REFERENCE TO RELATED APPLICATION

This application is a continuation of PCT Application No. PCT/CN2018/086160 filed on May 9, 2018, and claims priority to PCT Application No. PCT/CN2018/076581 filed on Feb. 12, 2018, the contents of which are hereby incorporated by reference in their entirety.

BACKGROUND

In Evolved Long Term Evolution (eLTE), a terminal device often uses a first Packet Data Convergence Protocol (PDCP) (e.g., an LTE PDCP) during the establishment of an initial connection, and then needs to configure the first PDCP into a second PDCP (e.g., a New Radio (NR) PDCP) before a Security Mode Command (SMC) message is sent. In the related art, after sending a message of indicating a network device to switch the PDCP to the network device, the terminal device may generate a message based on the second PDCP, and the message of indicating the network device to switch the PDCP may arrive at the network device later than the message generated based on the second PDCP because of multiple paths or delay, so the network device may still use the first PDCP to parse the message generated based on the second PDCP, which causes the parsing to fail.

SUMMARY

Embodiments of the present application relate to the field of communications, and in particular to a wireless communication method, a terminal device and a network device.

A first aspect provides a wireless communication method, which includes that: a terminal device determines that a first message generated based on a first PDCP has been successfully sent to a network device, the first message indicating the network device to switch the first PDCP to a second PDCP; and the terminal device sends a second message generated based on the second PDCP to the network device.

In an example, the first message may be a Radio Resource Control (RRC) connection establishment completion message. The method may further include that: after sending the RRC connection establishment completion message to the network device, the terminal device completes configuration of the second PDCP; and the terminal device generates the second message based on the second PDCP.

In an example, the operation that the terminal device determines that the first message generated based on the first PDCP has been successfully sent to the network device may include that: the terminal device receives a response message which is sent by the network device in response to the first message; and the terminal device determines, according to the response message, that the first message has been successfully sent to the network device.

In an example, the first PDCP may be an LTE PDCP, and the second PDCP may be an NR PDCP.

A second aspect provides a wireless communication method, which includes that: in a process of switching a PDCP, a network device parses a first message sent by a terminal device based on a first PDCP, and parses a second message sent by the terminal device after the first message based on a second PDCP, the first message indicating the network device to switch the PDCP from the first PDCP to the second PDCP.

In an example, the first message may be an RRC connection establishment completion message.

In an example, the operation that in the process of switching the PDCP, the network device parses, based on the first PDCP, the first message sent by the terminal device, and parses, based on the second PDCP, the second message sent by the terminal device after the first message is sent may include that: after sending the RRC connection establishment completion message, the network device parses the RRC connection establishment completion message based on the first PDCP, and parses the second message based on the second PDCP.

In an example, the method may further include that: after a connection between the terminal device and the network device is completed based on the second PDCP, the network device switches the PDCP from the first PDCP to the second PDCP.

In an example, the first PDCP may be an LTE PDCP, and the second PDCP may be an NR PDCP.

A third aspect provides a terminal device, which is configured to execute the method in the first aspect or any possible example of the first aspect. The terminal device may include units configured to execute the method in the first aspect or any possible example of the first aspect.

A fourth aspect provides a network device, which is configured to execute the method in the second aspect or any possible example of the second aspect. The network device may include units configured to execute the method in the second aspect or any possible example of the second aspect.

A fifth aspect provides a terminal device, which includes a memory, a processor, an input interface and an output interface. Herein, the memory, the processor, the input interface and the output interface can be connected through a bus system. The memory is configured to store an instruction. The processor is configured to execute the instruction stored in the memory to execute the method in the first aspect or any possible example of the first aspect.

A sixth aspect provides a network device, which includes a memory, a processor, an input interface and an output interface. Herein, the memory, the processor, the input interface and the output interface can be connected through a bus system. The memory is configured to store an instruction. The processor is configured to execute the instruction stored in the memory to execute the method in the second aspect or any possible example of the second aspect.

A seventh aspect provides a wireless communication method, which includes that: the terminal device receives the first message generated based on the first PDCP from the network device, the first message indicating the terminal device to use the second PDCP; and the terminal device sends, according to the first message, the second message generated based on the second PDCP to the network device An eighth aspect provides a wireless communication method, which includes that: the network device sends the first message generated based on the first PDCP to the terminal device, the first message indicating the terminal device to use the second PDCP; and the network device parses the second message sent by the terminal device based on the second PDCP, the second message being sent by the terminal device according to the first message.

In combination with the seventh aspect or the eighth aspect, in an example, the first message may be an RRC connection recovery response message.

In combination with the seventh aspect or the eighth aspect, in an example, the second message may be an RRC connection recovery completion message.

In combination with the seventh aspect or the eighth aspect, in an example, the first message may be an RRC connection establishment message.

In combination with the seventh aspect or the eighth aspect, in an example, the second message may be an RRC connection establishment completion message.

In combination with the seventh aspect or the eighth aspect, in an example, the first PDCP may be an LTE PDCP, and the second PDCP may be an NR PDCP.

A ninth aspect provides a terminal device, which is configured to execute the method in the seventh aspect or any possible example of the seventh aspect. The terminal device may include units configured to execute the method in the seventh aspect or any possible example of the seventh aspect.

A tenth aspect provides a network device, which is configured to execute the method in the eighth aspect or any possible example of the eighth aspect. The network device may include units configured to execute the method in the eighth aspect or any possible example of the eighth aspect.

An eleventh aspect provides a terminal device, which includes a memory, a processor, an input interface and an output interface. Herein, the memory, the processor, the input interface and the output interface are connected through a bus system. The memory is configured to store an instruction. The processor is configured to execute the instruction stored in the memory to execute the method in the seventh aspect or any possible example of the seventh aspect.

A twelfth aspect provides a network device, which includes a memory, a processor, an input interface and an output interface. Herein, the memory, the processor, the input interface and the output interface are connected through a bus system. The memory is configured to store an instruction. The processor is configured to execute the instruction stored in the memory to execute the method in the eighth aspect or any possible example of the eighth aspect.

A thirteenth aspect provides a chip, which is configured to implement the method in the first aspect or any possible example of the first aspect, or the method in the seventh aspect or any possible example of the seventh aspect.

The chip may include: a processor, which is configured to call a computer program from the memory and run the computer program to cause a device provided with the chip to execute the method in the first aspect or any possible example of the first aspect, or the method in the seventh aspect or any possible example of the seventh aspect.

A fourteenth aspect provides a chip, which is configured to implement the method in the second aspect or any possible example of the second aspect, or the method in the eighth aspect or any possible example of the eighth aspect.

The chip may include: a processor, which is configured to call the computer program from the memory and run the computer program to cause the device provided with the chip to execute the method in the second aspect or any possible example of the second aspect, or the method in the eighth aspect or any possible example of the eighth aspect.

A fifteenth aspect provides a computer storage medium, which is configured to store a computer software instruction used for executing the method in the first aspect or any possible example of the first aspect, or the method in the second aspect or any possible example of the second aspect, or the method in the seventh aspect or any possible example of the seventh aspect, or the method in the eighth aspect or any possible example of the eighth aspect; the computer software instruction may include a program used for executing the methods in the above aspects.

A sixteenth aspect provides a computer program product including instructions. When the computer program product runs on a computer, the computer executes the method in the first aspect or any possible example of the first aspect, or the method in the second aspect or any possible example of the second aspect, or the method in the seventh aspect or any possible example of the seventh aspect, or the method in the eighth aspect or any possible example of the eighth aspect.

A seventeenth aspect provides a communication system, which includes a terminal device and a network device.

The terminal device is configured to determine that a first message generated based on the first PDCP has been successfully sent to a network device, the first message indicating the network device to switch the first PDCP to a second PDCP, and send a second message generated based on the second PDCP to the network device.

The network device is configured to parse, in the process of switching the PDCP, the first message sent by the terminal device based on the first PDCP, and parse, based on the second PDCP, the second message sent by the terminal device after the first message, the first message indicating the network device to switch the PDCP from the first PDCP to the second PDCP.

The terminal device is configured to execute the method in each example of the first aspect, and the network device is configured to execute the method in each example of the second aspect.

An eighteenth aspect provides a communication system, which includes a terminal device and a network device.

The terminal device is configured to receive a first message generated based on a first PDCP and sent by a network device, the first message indicating the terminal device to use a second PDCP, and send the second message generated based on a second PDCP to the network device.

The network device is configured to send the first message generated based on the first PDCP to the terminal device, the first message indicating the terminal device to use the second PDCP, and parse the second message sent by the terminal device based on the second PDCP, the second message being sent by the terminal device according to the first message.

The terminal device is configured to execute the method in each example of the seventh aspect, and the network device is configured to execute the method in each example of the eighth aspect.

BRIEF DESCRIPTION OF THE DRAWINGS

FIG. 7 illustrates another schematic block diagram of the terminal device according to an embodiment of the present application.

FIG. 8 illustrates another schematic block diagram of the network device according to an embodiment of the present application.

FIG. 9 is yet another schematic block diagram of the wireless communication method according to an embodiment of the present application.

DETAILED DESCRIPTION

The technical solutions in the embodiments of the present application are clearly and completely described below in combination with the accompanying drawings in the embodiments of the present application.

It is to be understood that the technical solutions of the embodiments of the present application may be applied to various communication systems, for example, an LTE system, an LTE Frequency Division Duplex (FDD) system, an LTE Time Division Duplex (TDD) system, a Universal Mobile Telecommunication System (UMTS), an NR system or the future 5G system evolution.

In the embodiments of the present application, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, any other processing devices connected to a wireless modem, a vehicle-mounted device, a wearable device, a terminal device in the future 5G network, a terminal device in the future evolved Public Land Mobile Network (PLMN) or the like. There are no limits made in the embodiments of the present application.

The network device in the embodiments of the present application may be a device used for communicating with a terminal device, or may be a NodeB (NB) in a WCDMA system, or may also be an Evolutional NodeB (eNB or eNodeB) in an LTE system or a wireless controller in a Cloud Radio Access Network (CRAN). Or the network device may be a relay station, an access point, a vehicle-mounted device, a wearable device, a network device in a future 5G network, a network device in a future evolved PLMN or the like. There are no limits made in the embodiments of the present application.

Figure 1:
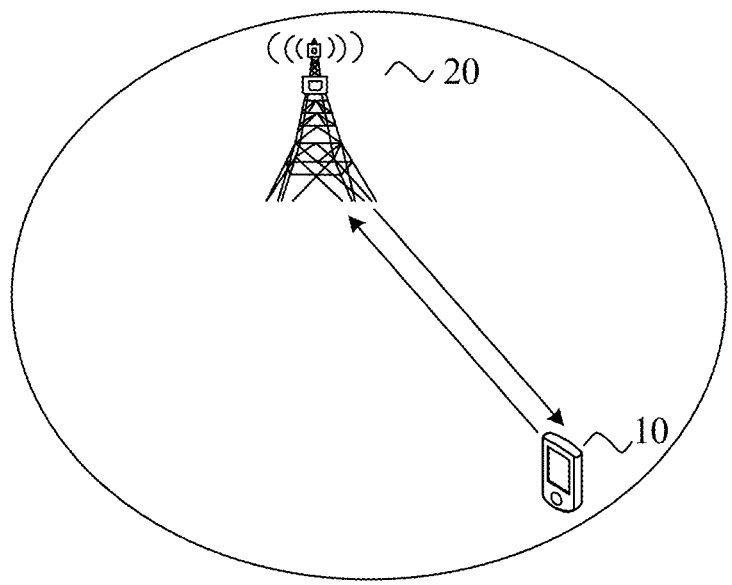
FIG. 1 illustrates a schematic diagram of an application scenario according to an embodiment of the present application.

FIG. 1 is a schematic diagram of an application scenario according to an embodiment of the present application. A communication system in FIG. 1 may include a terminal device 10 and a network device 20. The network device 20 is configured to provide a communication service for the terminal device 10 for access to a core network. The terminal device 10 can search for a synchronous signal, broadcast signal and the like sent by the network device 20 to access the network, thereby communicating with the network. Arrows shown in FIG. 1 may represent uplink/downlink transmission implemented through a cellular link between the terminal device 10 and the network device 20.

In eLTE, the terminal device can use a first PDCP during the establishment of an initial connection, and then needs to configure the first PDCP into a second PDCP before an SMC message is sent. The first PDCP may be an LTE PDCP, and the second PDCP may be an NR PDCP. The process of switching a PDCP in the related art is schematically illustrated below in combination with FIG. 2. The process specifically includes the following steps.

At S101, a terminal device sends an RRC request to a network device.

At S102, the network device sends an RRC connection establishment message to the terminal device.

At S103, when a core network providing a service for the terminal device is switched to the core network in the NR, the terminal device sends an RRC connection establishment completion message generated based on the LTE PDCP to the network device, and the network device parses the RRC connection establishment completion message based on the LTE PDCP.

At S104, the terminal device configures the NR PDCP, and switches a PDCP to the NR PDCP to transmit signaling.

At S105, the network device sends a SMC message to the terminal device, the SMC message being a message based on a security algorithm in the NR, and the terminal device parses the SMC message based on the NR PDCP.

At S106, the terminal device sends a security mode completion message generated based on the NR PDCP to the network device, and the network device parses the security mode completion message based on the NR PDCP.

It can be seen from FIG. 2 that after the terminal device sends the RRC connection establishment completion message, the RRC connection establishment completion message may arrive at the network device later than an RRC message generated by the terminal device based on an NR PDCP, due to multiple paths or delay or because the terminal sends the RRC message generated based on the NR PDCP immediately after the RRC connection establishment completion message is sent; and the network device may receive the RRC message generated based on the NR PDCP from the terminal device before the PDCP is switched to the NR PDCP, which causes the network device to be unable to parse the RRC message generated based on the NR PDCP.

So, the embodiments of the present application provide a wireless communication method, which can avoid the above problem.

Figure 3:
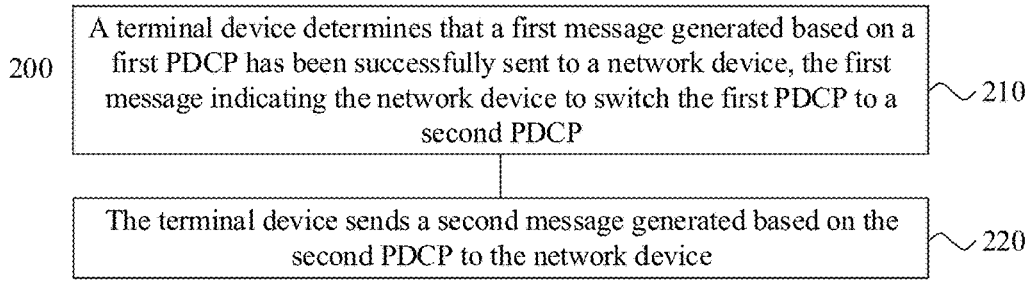
FIG. 3 is a schematic block diagram of a wireless communication method according to an embodiment of the present application.

FIG. 3 is a schematic block diagram of a wireless communication method 200 according to an embodiment of the present application. As illustrated in FIG. 3, the method 200 includes a part or all of the following operations.

At S210, a terminal device determines that a first message generated based on a first PDCP has been successfully sent to a network device, the first message indicating the network device to switch the PDCP from the first PDCP to the second PDCP.

At S220, the terminal device sends a second message generated based on the second PDCP to the network device.

The terminal device can initially transmit a message based on the first PDCP, that is, the network device can also parse the message based on the first PDCP. After sending a message of switching the PDCP to the network device, the terminal device may automatically switch the PDCP to the second PDCP to transmit the message, and in the case that the network device does not switch the PDCP to the second PDCP, the terminal device may generate messages based on the second PDCP, and these messages generated based on the second PDCP may arrive at the network device earlier than the message sent by the terminal device for indicating the network device to switch the PDCP. The terminal device may send these messages generated based on the second PDCP after determining that the message for indicating the network device to switch the PDCP has been successfully sent, so the network device may, after switching the PDCP to the second PDCP, correctly parse the message generated based on the second PDCP and sent by the terminal device.

Accordingly, the network device can correctly parse the messages sent by the terminal device.

As an example, the technical solutions of the embodiments of the present application involve the process of switching the PDCP. For example, the terminal device may first use the LTE PDCP to generate a message and send the message to the network device when the initial connection is established, and then use the NR PDCP to generate a message and send the message to the network device after completing the configuration of the NR PDCP. In the embodiments of the present application, the message generated based on the PDCP may be an RRC message.

Figure 2:
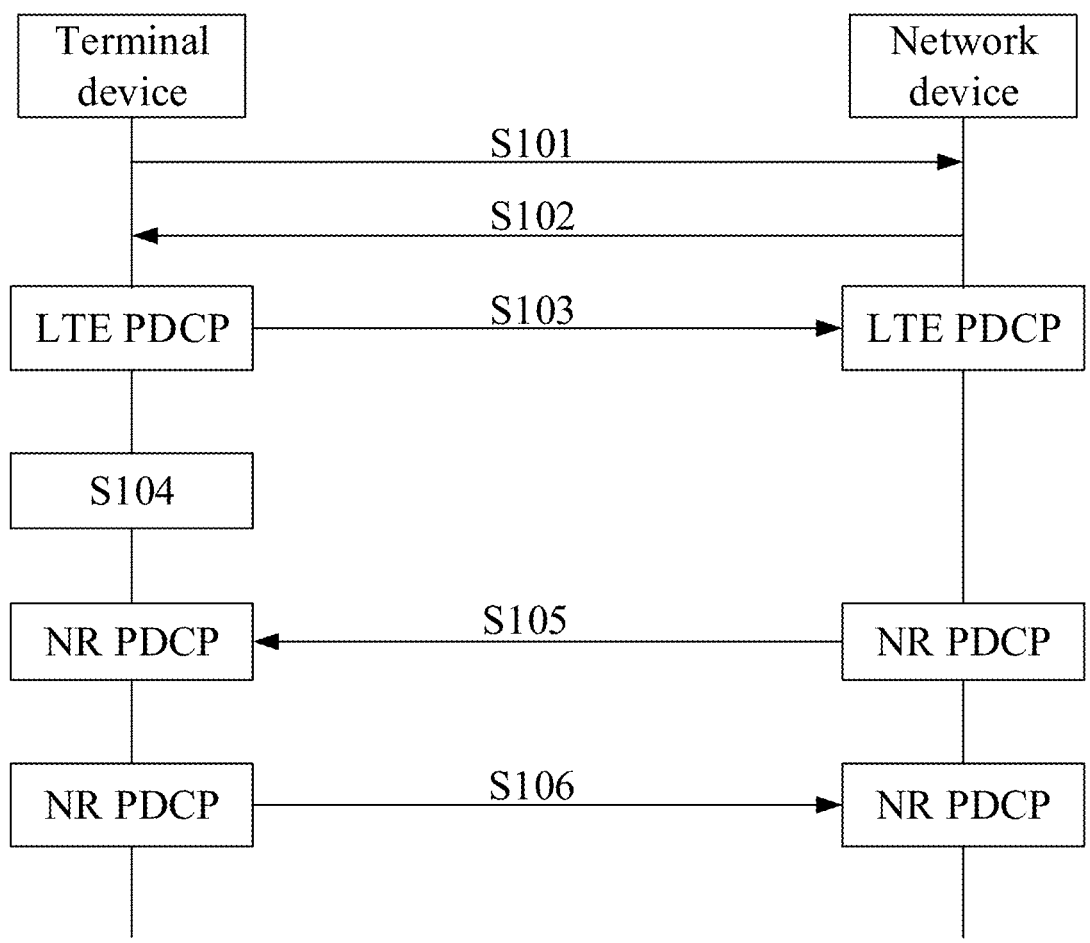
FIG. 2 illustrates a schematic flowchart of switching a PDCP according to an embodiment of the present application.

Furthermore, the first message in the embodiments of the present application may be the RRC connection establishment completion message involved in S103 in FIG. 2. The first message may also be a single message, which is not limited in the embodiments of the present application. After sending the RRC connection establishment completion message to the network device, the terminal device may configure the second PDCP, and generate the second message in the embodiments of the present application based on the second PDCP after completing the configuration. For example, the second message may be the SMC message involved in S106 in FIG. 2.

It is to be understood that in the disclosure, the descriptions are given by taking that the first PDCP is an LTE PDCP, and the second PDCP is an NR PDCP for example, but the embodiments of the present application are not limited to this, and the technical solutions are applicable to all scenarios of switching the PDCP.

As an example, in the embodiments of the present application, the operation that the terminal device determines that the first message generated based on the first PDCP has been successfully sent to the network device may include that: the terminal device receives a response message which is sent by the network device in response to the first message; and the terminal device determines, according to the response message, that the first message has been successfully sent to the network device.

The terminal device may determine that the first message has been successfully sent upon receiving a response to the first message from the network device. The network device may also be configured to not send a response to the terminal device after receiving the first message, but give a feedback to the terminal device in a situation that the first message is not received within a certain period of time. Then, the terminal device may start a timer after sending the first message. In a case that the terminal device receives the feedback to the first message within a duration of the timer, it can be considered that the first message is not sent successfully, and the terminal device may continue to send the first message to the network device. In a case that the terminal device does not receive the feedback to the first message within the duration of the timer, the terminal device may consider that the first message is sent successfully when the timer times out. How the terminal device determines that the first message is sent successfully may be based on the implementation of the terminal device. There are no limits made in the embodiments of the present application.

Figure 4:
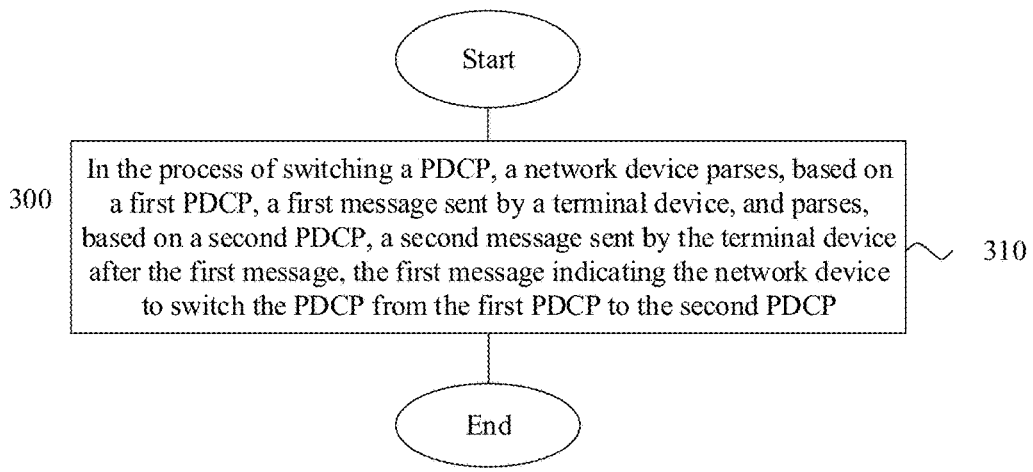
FIG. 4 is another schematic block diagram of a wireless communication method according to an embodiment of the present application.

FIG. 4 is a schematic block diagram of a wireless communication method 300 according to an embodiment of the present application. As illustrated in FIG. 4, the method 300 includes a part or all of the following operations.

At S310, in the process of switching a PDCP, a network device parses, based on a first PDCP, a first message sent by a terminal device, and parses, based on a second PDCP, a second message sent by the terminal device after the first message, the first message indicating the network device to switch the PDCP from the first PDCP to the second PDCP.

Generally, the network device can switch the PDCP from the first PDCP to the second PDCP only after receiving from the terminal device a message of indicating the network device to switch the PDCP. That is, before receiving the first message of the embodiments of the present application, the network device may use the first PDCP to parse the messages (including the first message) sent by the terminal device. After receiving the first message, the network device may use the second PDCP to parse the messages sent by the terminal device. As mentioned above, because of multiple paths or delay, the messages sent after the first message may arrive at the network device earlier than the first message, and the messages sent after the first message may be generated based on the second PDCP; in this case, the network device does not switch the PDCP to the second PDCP because the network device does not receive the first message, the network device may use two PDCPs to parse the messages sent by the terminal device with no need of firstly switching the PDCP, namely using the first PDCP to parse the first message and using the second PDCP to parse the messages sent after the first message.

Accordingly, the network device can correctly parse the messages sent by the terminal device.

As an example, the technical solutions of the embodiments of the present application involve the process of switching a PDCP. For example, the terminal device may use the LTE PDCP to generate a message and send the message to the network device when the initial connection is established, and then use the NR PDCP to generate a message and send the message to the network device after completing the configuration of the NR PDCP. In the embodiments of the present application, the message generated based on the PDCP may be an RRC message.

The network device may use two PDCPs after sending the RRC connection establishment message involved in S102 in FIG. 2 to the terminal device and in the process of waiting for the RRC connection establishment completion message. For example, the network device may use the LTE PDCP to parse the RRC connection establishment completion message, and use the NR PDCP to parse the messages sent by the terminal device after the RRC connection establishment completion message. That is, if the network device receives the RRC connection establishment completion message after sending the RRC connection establishment message, the network device may use the LTE PDCP to parse the message; if the network device receives the messages generated based on the NR PDCP and sent after the RRC connection establishment completion message, the network device may use the NR PDCP to parse the message.

As an example, after a connection between the terminal device and the network device is completed based on the second PDCP, the network device may switch the PDCP from the first PDCP to the second PDCP.

For example, after determining that a Signaling Radio Bear (SRB) and a Data Radio Bearer (DRB) based on the NR PDCP are completely established between the terminal device and the network device, the network device may only use the NR PDCP to parse the messages sent by the terminal device. Specifically, the network device may consider that after the RRC connection establishment completion message is received, the connection between the terminal device and the network device based on the NR PDCP is established completely.

It is to be understood that in the disclosure, the descriptions are given by taking that the first PDCP is the LTE PDCP and the second PDCP is the NR PDCP as an example, but no limits are set by the embodiments of the present application, and the technical solutions are applicable to all scenarios of switching a PDCP.

It is to be further understood that interaction between the network device and the terminal device and related properties, functions and the like described from the aspect of the network device correspond to related properties, functions and the like described from the aspect of the terminal device. In other words, the message, which is sent to the network device by the terminal device, is the message that the network device receives from the terminal device.

It is to be further understood that, in various embodiments of the present invention, the sequence number of each process does not mean an execution order. The execution order of each process can be determined by its function and an internal logic and should not form any limit to an implementation process of the embodiments of the present application.

It is to be further understood that, in the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The wireless communication method according to the embodiments of the present application is described in detail above. A wireless communication device according to the embodiments of the present application is described below in combination with FIG. 5 to FIG. 8. The technical features described in the method embodiment are applicable to the following device embodiment.

Figure 5:
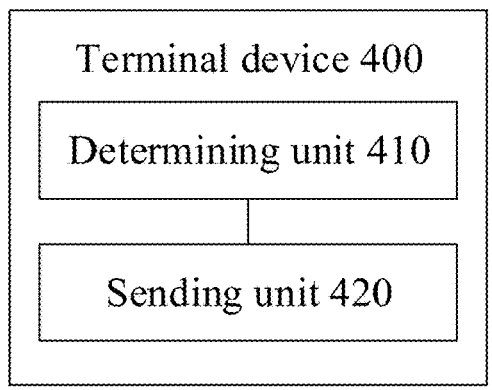
FIG. 5 is a schematic block diagram of a terminal device according to an embodiment of the present application.

FIG. 5 illustrates a schematic block diagram of a terminal device 400 according to an embodiment of the present application. As shown in FIG. 5, the network device 400 includes a determining unit 410 and a sending unit 420.

The determining unit 410 is configured to determine that a first message generated based on a first PDCP has been successfully sent to a network device, the first message indicating the network device to switch the first PDCP to a second PDCP.

The sending unit 420 is configured to send a second message generated based on the second PDCP to the network device.

Accordingly, the network device can correctly parse the messages sent by the terminal device.

As an example, in the embodiments of the present application, the first message may be an RRC connection establishment completion message. The terminal device may further include: a configuring unit, configured to complete the configuration of the second PDCP after the RRC connection establishment completion message is sent to the network device, and a generating unit, configured to generate the second message based on the second PDCP.

As an example, in the embodiments of the present application, the determining unit may be specifically configured to: receive a response message which is sent by the network device in response to the first message; and determine according to the response message that the first message has been successfully sent to the network device.

As an example, in the embodiments of the present application, the first PDCP may be an LTE PDCP, and the second PDCP may be an NR PDCP.

It is to be understood that the terminal device 400 according to the embodiments of the present application may correspond to the terminal device in the method embodiment of the present application, and the above-mentioned and other operations and/or functions of each unit in the terminal device 400 may be adopted to implement the flows executed by the terminal device in the method in FIG. 3 respectively and will not be elaborated herein for simplicity.

Figure 6:
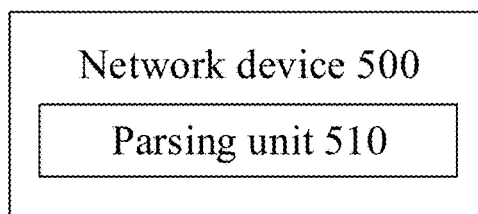
FIG. 6 is a schematic block diagram of a network device according to an embodiment of the present application.

FIG. 6 illustrates a schematic block diagram of the network device 500 according to an embodiment of the present application. As shown in FIG. 6, the network device 500 includes a parsing unit 510.

The parsing unit 510 is configured to, in the process of switching a PDCP, parse, based on a first PDCP, a first message sent by a terminal device, and parse, based on a second PDCP, a second message sent by the terminal device after the first message, the first message indicating the network device to switch the PDCP from the first PDCP to the second PDCP.

Accordingly, the network device can correctly parse the messages sent by the terminal device.

As an example, in the embodiments of the present application, the first message may be an RRC connection establishment completion message.

As an example, in the embodiments of the present application, the parsing unit may be specifically configured to: after an RRC connection establishment message is sent, parse the RRC connection establishment message based on the first PDCP, and parse the second message based on the second PDCP.

As an example, in the embodiments of the present application, the network device may further include: a switching unit, configured to switch, after the connection based on the second PDCP is completed between the terminal device and the network device, the PDCP from the first PDCP to the second PDCP.

As an example, in the embodiments of the present application, the first PDCP may be an LTE PDCP, and the second PDCP may be an NR PDCP.

It is to be understood that the network device 500 according to the embodiments of the present application may correspond to the network device in the method embodiment of the present application. The above-mentioned and other operations and/or functions of each unit in the network device 500 may be adopted to implement the flows executed by the network device in the method in FIG. 4 respectively and will not be elaborated herein for simplicity.

As shown in FIG. 7, an embodiment of the present application further provides a terminal device 600. The terminal device 600 may be the terminal device 400 in FIG. 5, and may be configured to execute the operations of the terminal device corresponding to the method 200 in FIG. 3. The terminal device 600 includes: an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program, instruction or code in the memory 640 to control the input interface 610 to receive a signal, control the output interface 620 to send a signal and complete operations in the method embodiments.

Accordingly, the terminal device can correctly parse the messages sent by the terminal device.

It is to be understood that in this embodiment of the present application, the processor 630 may be a Central Processing Unit (CPU). The processor 630 may also be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor and the like.

The memory 640 may include a Read Only Memory (ROM) and a Random Access Memory (RAM), and can provide instructions and data for the processor 630. A part of the memory 640 may further include a nonvolatile RAM. For example, the memory 640 may store information on a type of a storage device.

During an implementation process, the steps of the methods may be accomplished by an integrated logic circuit of hardware in the processor 630 or an instruction in a software form. Steps of the methods described in combination with the embodiments of the present application may be directly executed and accomplished by a hardware processor or a combination of hardware and software modules in the processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in the memory 640. The processor 630 may read information from the memory 640 and complete the steps of the foregoing methods in combination with the hardware of the processor. In order to avoid repetition, the above will not be described herein in detail.

In an example, the sending unit in the terminal device 400 may be realized by the output interface 620 in FIG. 7. The determining unit, the configuring unit and the generating unit in the terminal device 400 may be realized by the processor 630 in FIG. 7.

As shown in FIG. 8, the embodiments of the present application also provide a network device 700. The network device 700 may be the network device 500 in FIG. 6, and may be configured to execute the operations of the network device corresponding to the method 300 in FIG. 4. The network device 700 includes: an input interface 710, an output interface 720, a processor 730 and a memory 740. The input interface 710, the output interface 720, the processor 730 and the memory 740 may be connected through a bus system. The memory 740 is configured to store a program, an instruction or a code. The processor 730 is configured to execute the program, instruction or code in the memory 740 to control the input interface 710 to receive a signal, control the output interface 720 to send a signal and complete operations in the method embodiments.

Accordingly, the network device can correctly parse the messages sent by the terminal device.

It is to be understood that in this embodiment of the present application, the processor 730 may be a Central Processing Unit (CPU). The processor 730 may also be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor and the like.

The memory 740 may include a Read Only Memory (ROM) and a Random Access Memory (RAM) and can provide instructions and data for the processor 730. A part of the memory 740 may further include a nonvolatile RAM. For example, the memory 740 may store information on a type of a storage device.

During an implementation process, the steps of the methods may be accomplished by an integrated logic circuit of hardware in the processor 730 or an instruction in a software form. Steps of the methods described in combination with the embodiments of the present application may be directly executed and accomplished by a hardware processor or a combination of hardware and software modules in the processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in the memory 740. The processor 730 may read information from the memory 740 and complete the steps of the foregoing methods in combination with the hardware of the processor. In order to avoid repetition, the above will not be described herein in detail.

In an example, the parsing unit and the switching unit in the network device 500 may be realized by the processor 730 in FIG. 8.

FIG. 9 is a schematic block diagram of a wireless communication method 800 according to an embodiment of the present application. As illustrated in FIG. 9, the method 800 includes a part or all of the following operations.

At S810, a terminal device receives a first message generated based on a first PDCP from a network device, the first message indicating the terminal device to use a second PDCP.

At S820, the terminal device sends a second message generated based on the second PDCP to the network device according to the first message.

The network device may instruct the terminal device to change a PDCP version, and change the PDCP version after giving an instruction; after receiving the instruction from the network device, the terminal device may also change the PDCP version. That is, after giving the instruction, the network device may send the message generated based on the changed PDCP version to the terminal device, or parse the messages sent by the terminal device based on the changed PDCP version. After the terminal device receives the instruction, the message sent to the network device may be generated based on the changed PDCP version.

Figure 10:
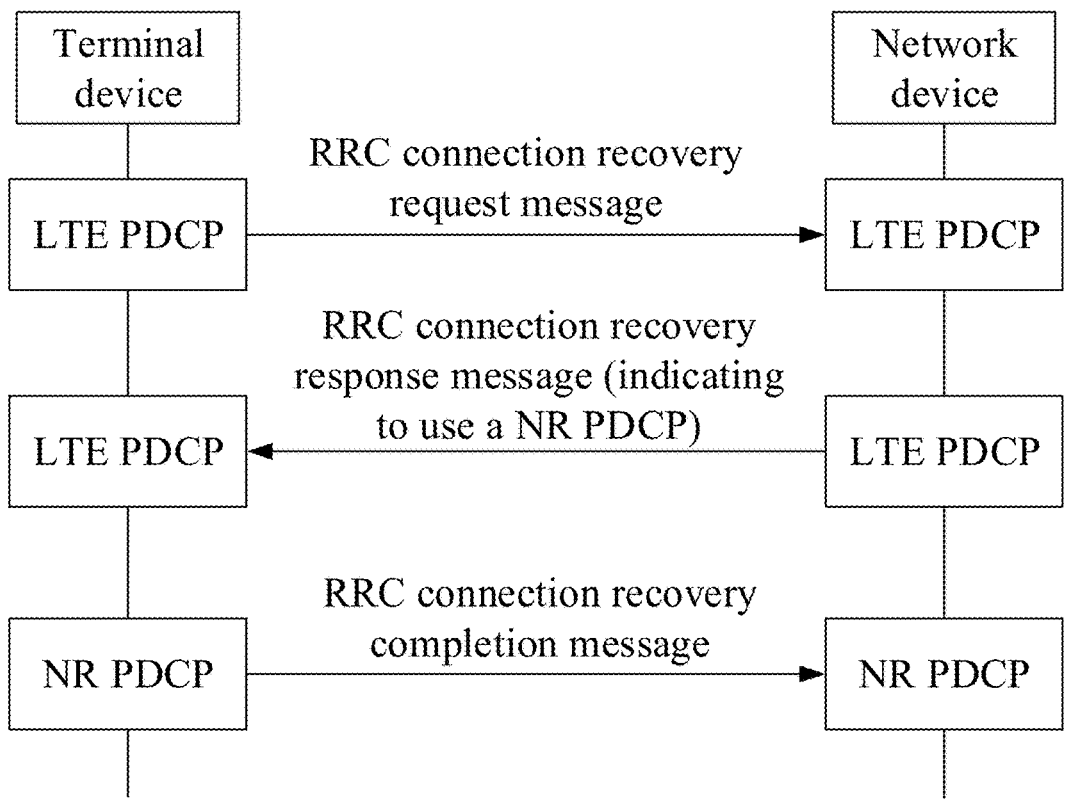
FIG. 10 is yet another schematic block diagram of the wireless communication method according to an embodiment of the present application.
Figure 11:
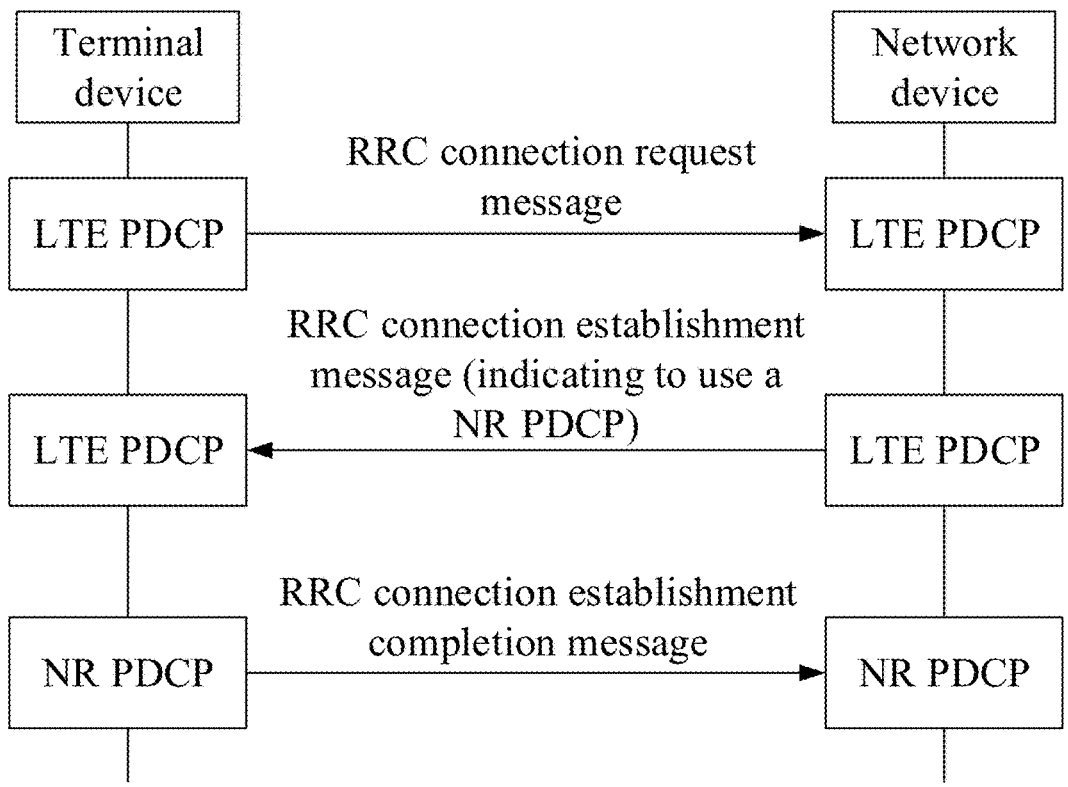
FIG. 11 is yet another schematic block diagram of the wireless communication method according to an embodiment of the present application.

As an example, the embodiments of the present application may be applied to both an RRC connection establishment process and an RRC connection recovery process. For example, the first message may be an RRC connection recovery response message, and the second message may be an RRC connection recovery completion message. Specifically, as shown in FIG. 10, the terminal device may send, in an inactive state, the RRC connection recovery request message generated based on the LTE PDCP to the network device, and the network device may send the RRC connection recovery response message generated based on the LTE PDCP after receiving the RRC connection recovery request message. The RRC connection recovery response message may instruct the terminal device to use the NR PDCP, and then the terminal device may send the RRC connection recovery completion message generated based on the NR PDCP to the network device after receiving the RRC connection recovery response message. After sending the RRC connection recovery response message, the network device may use the NR PDCP to parse the RRC connection recovery completion message sent by the terminal device. For another example, the first message may be the RRC connection establishment message, and the second message may be the RRC connection establishment completion message. Specifically, as illustrated in FIG. 11, the terminal device may send, in an idle state, an RRC connection request message generated based on the LTE PDCP to the network device, and the network device may send the RRC connection establishment message generated based on the LTE PDCP to the terminal device after receiving the RRC connection request message. The RRC connection establishment message may instruct the terminal device to use the NR PDCP, and then the terminal device may send the RRC connection establishment completion message generated based on the NR PDCP to the network device after receiving the RRC connection establishment message. After sending the RRC connection establishment message, the network device may use the NR PDCP to parse the RRC connection establishment completion message sent by the terminal device.

It is to be understood that in the disclosure, the descriptions are given by taking that the first PDCP is the LTE PDCP and the second PDCP is the NR PDCP as an example, but no limits are set to the embodiments of the present application. The technical solutions are applicable to all scenarios of changing the PDCP.

It is to be noted that the first message of the embodiments of the present application may also be independent of the RRC connection establishment message or the RRC connection recovery response message, and may also be a reused RRC connection establishment message or a reused RRC connection recovery response message; the second message may be any message sent by the terminal device to the network device after the RRC connection establishment message or the RRC connection recovery response message. There are no limits made in the embodiments of the present application.

Figure 12:
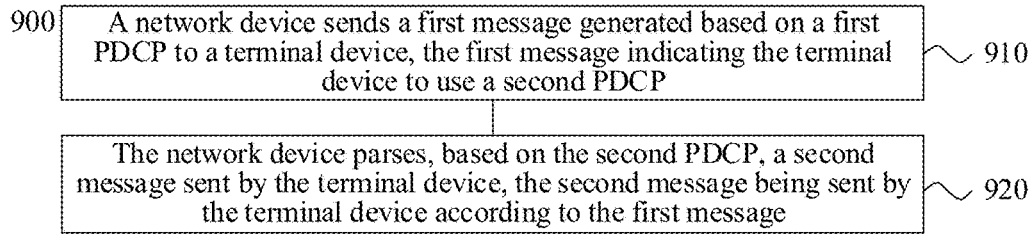
FIG. 12 is yet another schematic block diagram of the wireless communication method according to an embodiment of the present application.

FIG. 12 is a schematic block diagram of a wireless communication method 900 according to an embodiment of the present application. As illustrated in FIG. 12, the method 900 includes a part or all of the following operations.

At S910, a network device sends a first message generated based on a first PDCP to a terminal device, the first message indicating the terminal device to use a second PDCP.

At S920, the network device parses, based on the second PDCP, a second message sent by the terminal device, the second message being sent by the terminal device according to the first message.

It is to be further understood that interaction between the network device and the terminal device and related properties, functions and the like described from the network device correspond to related properties, functions and the like of the terminal device. In other words, the message, which is sent to the network device by the terminal device, is the message that the network device receives from the terminal device.

It is to be further understood that, in various embodiments of the present invention, the sequence number of each process does not mean an execution sequence, and the execution sequence of each process may be determined by its function and an internal logic and should not form any limit to an implementation process of the embodiments of the present application.

The wireless communication method according to the embodiments of the present application is described in detail above. A wireless communication device according to the embodiments of the present application is described below in combination with FIG. 13 to FIG. 16. The technical features described in the method embodiment are applicable to the following device embodiment.

Figure 13:
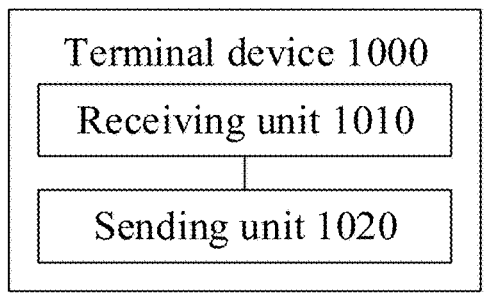
FIG. 13 is yet another schematic block diagram of the terminal device according to an embodiment of the present application.

FIG. 13 is a schematic block diagram of a terminal device 1000 according to an embodiment of the present application. As shown in FIG. 13, the terminal device 1000 includes a receiving unit 1010 and a sending unit 1020.

The receiving unit 1010 is configured to receive a first message generated based on a first PDCP from a network device, the first message indicating a terminal device to use a second PDCP.

The sending unit 1020 is configured to send, according to the first message, a second message generated based on the second PDCP to the network device.

As an example, in the embodiments of the present application, the first message may be an RRC connection recovery response message.

As an example, in the embodiments of the present application, the second message may be an RRC connection recovery completion message.

As an example, in the embodiments of the present application, the first message may be an RRC connection establishment message.

As an example, in the embodiments of the present application, the second message may be an RRC connection establishment completion message.

As an example, in the embodiments of the present application, the first PDCP may be an LTE PDCP, and the second PDCP may be an NR PDCP.

It is to be understood that the terminal device 1000 according to the embodiments of the present application may correspond to the terminal device in the method embodiment of the present application, and the above-mentioned and other operations and/or functions of each unit in the terminal device 1000 are adopted to implement the corresponding flows executed by the terminal device in the method in FIG. 9 respectively and will not be elaborated herein for simplicity.

Figure 14:
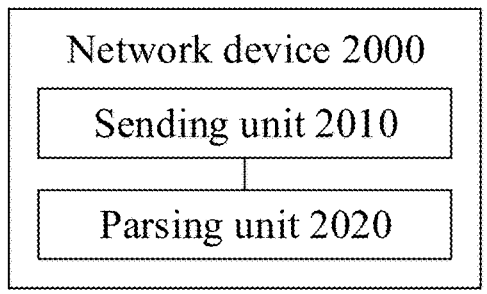
FIG. 14 is yet another schematic block diagram of the network device according to an embodiment of the present application.

FIG. 14 illustrates a schematic block diagram of a network device 2000 according to an embodiment of the present application. As shown in FIG. 14, the network device 2000 includes a sending unit 2010 and a parsing unit 2020.

The sending unit 2010 is configured to send a first message generated based on a first PDCP to a terminal device, the first message indicating the terminal device to use a second PDCP.

The parsing unit 2020 is configured to parse, based on the second PDCP, a second message sent by the terminal device, the second message being sent by the terminal device according to the first message.

As an example, in the embodiments of the present application, the first message may be an RRC connection recovery response message.

As an example, in the embodiments of the present application, the second message may be an RRC connection recovery completion message.

As an example, in the embodiments of the present application, the first message may be an RRC connection establishment message.

As an example, in the embodiments of the present application, the second message may be an RRC connection establishment completion message.

As an example, in the embodiments of the present application, the first PDCP may be an LTE PDCP, and the second PDCP may be an NR PDCP.

It is to be understood that the network device 2000 according to the embodiments of the present application may correspond to the network device in the method embodiment of the present application, and the above-mentioned and other operations and/or functions of each unit in the network device 2000 are adopted to implement the corresponding flows executed by the network device in the method in FIG. 12 respectively and will not be elaborated herein for simplicity.

Figure 15:
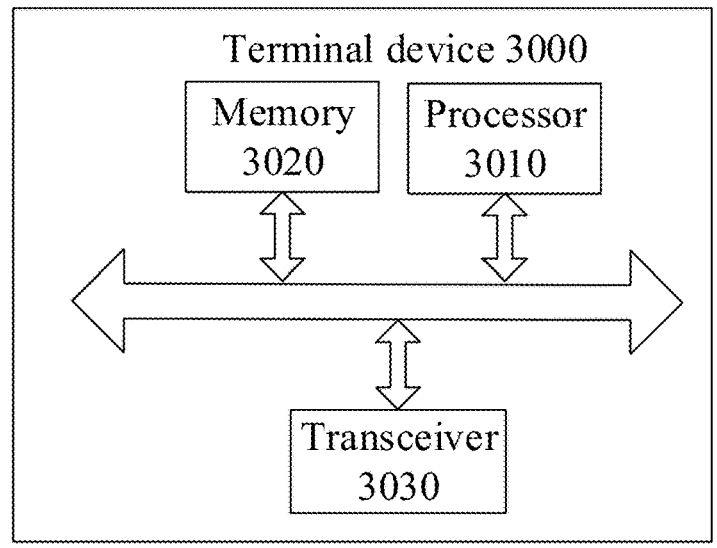
FIG. 15 is yet another schematic block diagram of the terminal device according to an embodiment of the present application.

As shown in FIG. 15, the embodiments of the present application further provide a terminal device 3000. The terminal device 3000 may be the terminal device 1000 in FIG. 13, and may be configured to execute contents of the terminal device corresponding to the method 800 in FIG. 9. The terminal device 3000 illustrated in FIG. 15 includes a processor 3010. The processor 3010 may call a computer program from a memory and run the program, to implement the method in the embodiments of the present application.

As an example, as illustrated in FIG. 15, the terminal device 3000 may further include the memory 3020. The processor 3010 may call the computer program from the memory 3020 and run the program, to implement the method in the embodiments of the present application.

The memory 3020 may be a separate device independent of the processor 3010, or may be integrated in the processor 3010.

As an example, as illustrated in FIG. 15, the terminal device 3000 may further include a transceiver 3030. The processor 3010 may control the transceiver 3030 to communicate with other devices, specifically, the transceiver may send information or data to other devices, or receive information or data sent by the other devices.

The transceiver 3030 may include a transmitter and a receiver. The transceiver 3030 may further include an antenna. The number of the antenna may be one or more than one.

As an example, the terminal device 3000 may be the terminal device in the embodiments of the present application, and the terminal device 3000 may implement the corresponding flows, implemented by the above-mentioned terminal device, in each method of the embodiments of the present application, which will not be elaborated herein for simplicity.

In an example, the receiving unit and the sending unit in the terminal device 1000 may be realized by the transceiver 3030 in FIG. 15.

Figure 16:
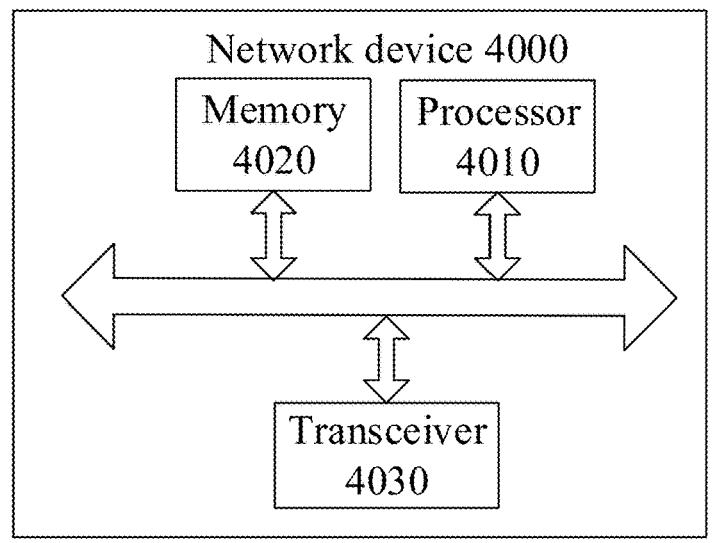
FIG. 16 is yet another schematic block diagram of the network device according to an embodiment of the present application.

As shown in FIG. 16, the embodiments of the present application further provide a network device 4000. The network device 4000 may be the network device 1000 in FIG. 14, and may be configured to execute the operations of the network device corresponding to the method 800 in FIG. 12. The network device 4000 illustrated in FIG. 16 includes a processor 4010. The processor 4010 may call the computer program from a memory and run the program, to implement the method in the embodiments of the present application.

As an example, as illustrated in FIG. 16, the network device 4000 may further include the memory 4020. The processor 4010 may call a computer program from the memory 4020 and run the program to implement the method in the embodiments of the present application.

The memory 4020 may be a separate device independent of the processor 4010, or may be integrated in the processor 4010.

As an example, as illustrated in FIG. 16, the network device 4000 may further include the transceiver 4030. The processor 4010 may control the transceiver 4030 to communicate with other devices, specifically, the transceiver may send information or data to other devices, or receive information or data sent by the other devices.

The transceiver 4030 may include a transmitter and a receiver. The transceiver 4030 may further include an antenna. The number of the antenna may be one or more than one.

As an example, the network device 4000 may be the network device in the embodiments of the present application, and the network device 4000 may implement the corresponding flows, implemented by the above-mentioned network device, in each method of the embodiments of the present application, which will not be elaborated herein for simplicity.

In an example, the sending unit in the network device 2000 may be configured by the transceiver 4030 in FIG. 16. The parsing unit in the network device 2000 may be realized by the processor 4010 in FIG. 16.

Figure 17:
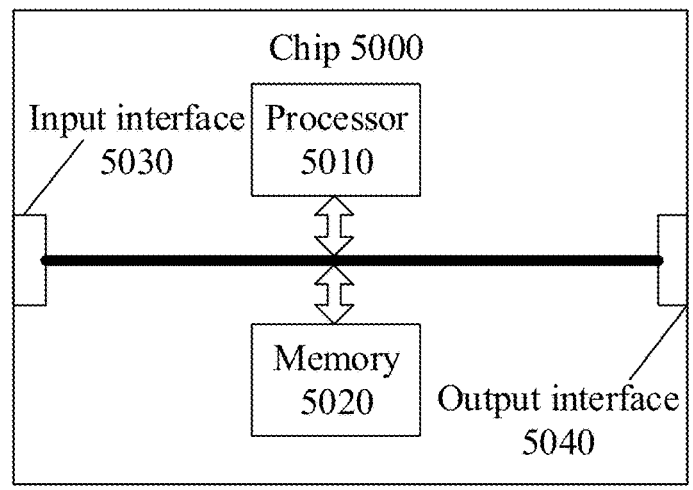
FIG. 17 illustrates a schematic block diagram of a chip according to an embodiment of the present application.

FIG. 17 is a schematic block diagram of a chip 5000 according to an embodiment of the present application. The chip 5000 illustrated in FIG. 17 includes a processor 5010. The processor 5010 may call a computer program from a memory and run the program to implement the method 100 in the embodiments of the present application.

As an example, as illustrated in FIG. 17, the chip 5000 may further include a memory 5020. The processor 5010 may call a computer program from a memory 5020 and run the program to implement the method in the embodiments of the present application.

The memory 5020 may be a separate device independent of the processor 5010, or may be integrated in the processor 5010.

As an example, the chip 5000 may further include an input interface 5030. The processor 5010 may control the input interface 5030 to communicate with other devices or chips; specifically, the input interface may acquire information or data from other devices or chips.

As an example, the chip 5000 may further include an output interface 5040. The processor 5010 may control the output interface 5040 to communicate with other devices or chips; specifically, the output interface may output information or data to other devices or chips.

As an example, the chip may be implemented by the terminal device in the embodiments of the present application, and the chip may implement the corresponding flows, implemented by the terminal device, in the method 200 of the embodiments of the present application, which will not be elaborated herein for simplicity.

It is to be understood that the chip mentioned in the embodiments of the present application may also be called a system-level chip, a system chip, a chip system or a system-on-chip.

Figure 18:
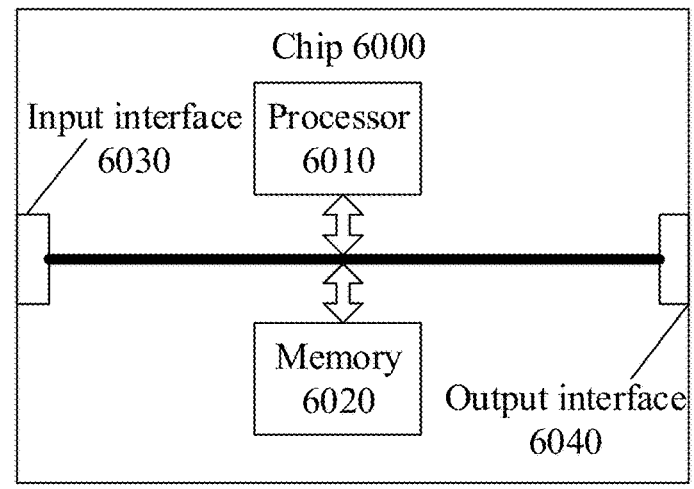
FIG. 18 is another schematic block diagram of the chip according to an embodiment of the present application.

FIG. 18 is a schematic block diagram of a chip 6000 according to an embodiment of the present application. The chip 6000 illustrated in FIG. 18 includes a processor 6010. The processor 6010 may call the computer program from the memory and run the program, to implement the method 100 in the embodiments of the present application.

As an example, as illustrated in FIG. 18, the chip 6000 may further include a memory 6020. The processor 6010 may call a computer program from a memory 6020 and run the program to implement the method in the embodiments of the present application.

The memory 6020 may be a separate device independent of the processor 6010, or may be integrated in the processor 6010.

As an example, the chip 6000 may further include an input interface 6030. The processor 6010 may control the input interface 6030 to communicate with other devices or chips; specifically, the input interface may acquire information or data from other devices or chips.

As an example, the chip 6000 may further include an output interface 6040. The processor 6010 may control the output interface 6040 to communicate with other devices or chips; specifically, the output interface may output information or data to other devices or chips.

As an example, the chip may be applied to the terminal device in the embodiments of the present application, and the chip may implement the corresponding flows, implemented by the terminal device, in the method 300 of the embodiments of the present application, which will not be elaborated herein for simplicity.

It is to be understood that the chip mentioned in the embodiments of the present application may also be called a system-level chip, a system chip, a chip system or a system-on-chip.

Figure 19:
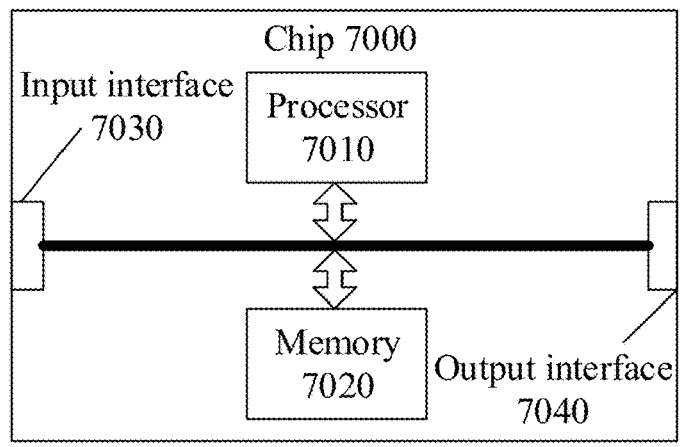
FIG. 19 is yet another schematic block diagram of the chip according to an embodiment of the present application.

FIG. 19 is a schematic block diagram of a chip 7000 according to an embodiment of the present application. The chip 7000 illustrated in FIG. 19 includes a processor 7010. The processor 7010 may call a computer program from a memory and run the program to implement the method 100 in the embodiments of the present application.

As an example, as illustrated in FIG. 19, the chip 7000 may further include a memory 7020. The processor 7010 may call a computer program from the memory 7020 and run the program to implement the method in the embodiments of the present application.

The memory 7020 may be a separate device independent of the processor 7010, or may be integrated in the processor 7010.

As an example, the chip 7000 may further include an input interface 7030. The processor 7010 may control the input interface 7030 to communicate with other devices or chips; specifically, the input interface may acquire information or data from other devices or chips.

As an example, the chip 7000 may further include an output interface 7040. The processor 7010 may control the output interface 7040 to communicate with other devices or chips; specifically, the output interface may output information or data to other devices or chips.

As an example, the chip may be implemented by the terminal device in the embodiments of the present application, and the chip may implement the corresponding flows, implemented by the terminal device, in the method 800 of the embodiments of the present application, which will not be elaborated herein for simplicity.

It is to be understood that the chip mentioned in the embodiments of the present application may also be called a system-level chip, a system chip, a chip system or a system-on-chip.

Figure 20:
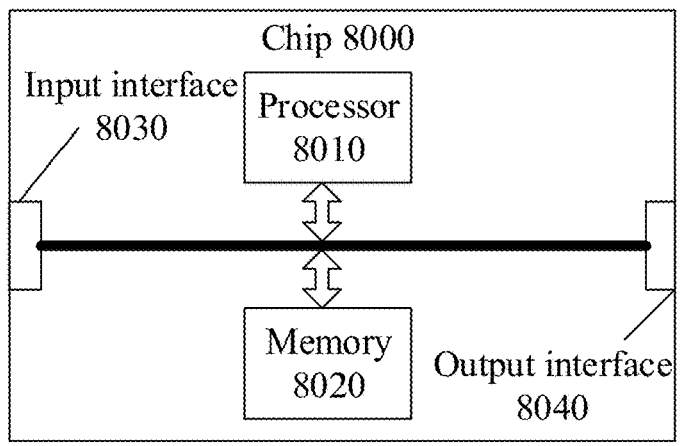
FIG. 20 is yet another schematic block diagram of the chip according to an embodiment of the present application.

FIG. 20 is a schematic block diagram of a chip 8000 according to an embodiment of the present application. The chip 8000 illustrated in FIG. 20 includes a processor 8010. The processor 8010 may call a computer program from a memory and run the program to implement the method 100 in the embodiments of the present application.

As an example, as illustrated in FIG. 20, the chip 8000 may further include a memory 8020. The processor 8010 may call a computer program from the memory 8020 and run the program to implement the method in the embodiments of the present application.

The memory 8020 may be a separate device independent of the processor 8010, or may be integrated in the processor 8010.

As an example, the chip 8000 may further include an input interface 8030. The processor 8010 may control the input interface 8030 to communicate with other devices or chips; specifically, the input interface may acquire information or data from other devices or chips.

As an example, the chip 8000 may further include an output interface 8040. The processor 8010 may control the output interface 8040 to communicate with other devices or chips; specifically, the output interface may output information or data to other devices or chips.

As an example, the chip may be implemented by the terminal device in the embodiments of the present application, and the chip may implement the corresponding flows, implemented by the terminal device, in the method 900 of the embodiments of the present application, which will not be elaborated herein for simplicity.

It is to be understood that the chip mentioned in the embodiments of the present application may also be called a system-level chip, a system chip, a chip system or a system-on-chip.

The processors mentioned above may be a universal processor, a Digital Signal Processor (DSP), a Field Programmable Gate Array (FPGA), an Application Specific Integrated Circuit (ASIC) or other programmable logical devices, a transistor logical device and a discrete hardware component. The universal processor mentioned above may be a microprocessor or any conventional processor and the like.

The memory mentioned above may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM).

It is to be understood that the memories above mentioned are exemplarily but unlimitedly described. For example, the memories in the embodiments of the present application may be a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM) and a Direct Rambus RAM (DR RAM). That is, the memories in the embodiments of the present application are intended to include, but not limited to, memories of these and any other proper types.

Figure 21:
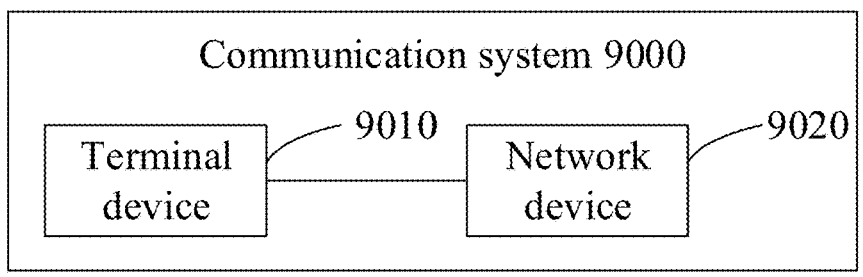
FIG. 21 is a schematic block diagram of a communication system according to an embodiment of the present application.

FIG. 21 is a schematic block diagram of a communication system 9000 according to an embodiment of the present application. As illustrated in FIG. 21, the communication system 9000 includes a terminal device 9010 and a network device 9020. The terminal device 9010 is configured to determine that a first message generated based on a first PDCP has been successfully sent to the network device, the first message indicating the network device to switch the first PDCP to a second PDCP, and send a second message generated based on the second PDCP to the network device.

The network device 9020 is configured to, in the process of switching the PDCP, parse, based on the first PDCP, the first message sent by the terminal device, and parse, based on the second PDCP, the second message sent by the terminal device after the first message, the first message indicating the network device to switch the PDCP from the first PDCP to the second PDCP.

The terminal device 9010 may be configured to implement corresponding functions, implemented by the terminal device, in the method 200. The composition of the terminal device 9010 may be the same as that of the terminal device 400 illustrated in FIG. 5, and will not be elaborated herein for simplicity.

The network device 9020 may be configured to implement corresponding functions, implemented by the network device, in the method 300. The composition of the network device 9020 may be the same as that of the network device 500 illustrated in FIG. 6, and will not be elaborated herein for simplicity.

Figure 22:
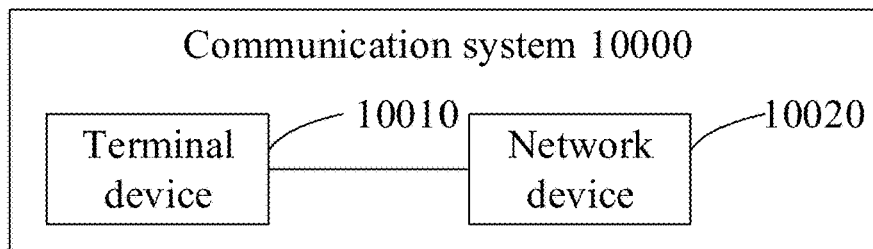
FIG. 22 is another schematic block diagram of the communication system according to an embodiment of the present application.

FIG. 22 is a schematic block diagram of a communication system 10000 according to an embodiment of the present application. As illustrated in FIG. 22, the communication system 10000 includes a terminal device 10010 and a network device 10020. The terminal device 10010 is configured to receive a first message generated based on the first PDCP from the network device, the first message indicating the terminal device to use a second PDCP, and send a second message generated based on the second PDCP to the network device.

The network device 10020 is configured to send the first message generated based on the first PDCP to the terminal device, the first message indicating the terminal device to use the second PDCP, and parse based on the second PDCP the second message sent by the terminal device, the second message being sent by the terminal device according to the first message.

The terminal device 10010 may be configured to implement the corresponding functions, implemented by the terminal device, in the method 800, and the composition of the terminal device 10010 may be the same as that of the terminal device 1000 illustrated in FIG. 13, and will not be elaborated herein for simplicity.

The network device 10020 may implement the corresponding functions, implemented by the network device, in the method 1000. The composition of the network device 10020 may be the same as that of the network device 2000 illustrated in FIG. 14, and will not be elaborated herein for simplicity.

Those of ordinary skill in the art may realize that the units and algorithm steps of each example described in combination with the embodiments in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present application.

Those skilled in the art may clearly learn about that specific working processes of the system, device and unit described above may refer to the corresponding processes in the method embodiment and will not be elaborated herein for convenient and brief description.

In some embodiments provided by the present application, it is to be understood that the described system, device and method may be implemented in other manners. For example, the device embodiment described above is merely schematic. For example, the unit division is merely logical function division, which may be other division in actual implementation. For example, a plurality of units or components may be combined or integrated into another system, or some features may be ignored or not performed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separate. The parts displayed as units may or may not be physical units, may be located in one position, or may be distributed on a plurality of network units. Part or all of the units may be selected to achieve the purpose of the solutions of the embodiments according to a practical requirement.

In addition, each functional unit in each embodiment of the present application may be integrated into a processing unit, each unit may also physically exist independently, and two or more than two units may also be integrated into a unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product may be stored in a storage medium and include several instructions for indicating a computer device (which may be a personal computer, a server, or a network device) to perform all or some of the steps described in the embodiments of the present application. The foregoing storage medium may include any medium that can store program code, such as a U disk, a removable hard disk, an ROM, an RAM, a magnetic disk, or an optical disc.

The above are only the specific implementations of the present application and not intended to limit the scope of protection of the present application. Any variations or replacements apparent to those skilled in the art within the technical scope described by the present application shall fall within the scope of protection of the present application. Therefore, the protection scope of the present application shall be subject to the protection scope of the claims.

The invention claimed is:

1. A wireless communication method, comprising:
    sending, by a terminal device, a first message generated based on a first Packet Data Convergence Protocol (PDCP) to a network device, the first message indicating the network device to switch the first PDCP to a second PDCP; and
    in response to determining that the first message has been successfully received by the network device, sending, by the terminal device, a second message generated based on the second PDCP to the network device.

2. The method of claim 1, wherein the first message is a Radio Resource Control (RRC) connection establishment completion message; the method further comprises:
    completing, by the terminal device, configuration of the second PDCP, after sending the RRC connection establishment completion message to the network device; and
    generating, by the terminal device, the second message based on the second PDCP.

3. The method of claim 1, wherein determining, by the terminal device, that the first message generated based on the first PDCP has been successfully sent to the network device comprises:
    receiving, by the terminal device, a response message which is sent by the network device in response to the first message; and
    determining, by the terminal device, that the first message has been successfully sent to the network device according to the response message.

4. The method of claim 1, wherein the first PDCP is a Long Term Evolution (LTE) PDCP, and the second PDCP is a New Radio (NR) PDCP.

5. A terminal device, comprising:
    a processor;
    a memory for storing instructions executable by the processor; and
    a transceiver, connected to the processor and the memory, configured to send and receive information under control of the processor,
    wherein the processor is configured to:
    control the transceiver to send a first message generated based on a first Packet Data Convergence Protocol (PDCP) to a network device, the first message indicating the network device to switch the first PDCP to a second PDCP; and
    in response to determining that the first message has been successfully received by the network device, control the transceiver to send a second message generated based on the second PDCP to the network device.

6. The terminal device of claim 5, wherein the first message is a Radio Resource Control (RRC) connection establishment completion message; the processor is further configured to:
    complete configuration of the second PDCP after the RRC connection establishment completion message is sent to the network device; and
    generate the second message based on the second PDCP.

7. The terminal device of claim 5, wherein the processor is further configured to:
    control the transceiver to receive a response message which is sent by the network device in response to the first message; and
    determine that the first message has been successfully sent to the network device according to the response message.

8. The terminal device of claim 5, wherein the first PDCP is a Long Term Evolution (LTE) PDCP, and the second PDCP is a New Radio (NR) PDCP.

9. The terminal device of claim 5, wherein the processor is further configured to:
    start a timer after sending the first message; and
    control the transceiver to send the first message in a case of receiving from the network device a feedback indicating that the first message is not received by the network device before the timer times out.

* * * * *